United States Patent [19]

Abe

[11] Patent Number: 4,494,026
[45] Date of Patent: Jan. 15, 1985

[54] BRUSH-MOUNTING STRUCTURE OF MINIATURE MOTOR

[75] Inventor: Masaru Abe, Kakuda, Japan

[73] Assignee: Alps Electric Co., Ltd., Tokyo, Japan

[21] Appl. No.: 509,719

[22] Filed: Jun. 30, 1983

[30] Foreign Application Priority Data

Jul. 1, 1982 [JP] Japan .............. 57-99876[U]

[51] Int. Cl.³ .............................. H02K 9/00
[52] U.S. Cl. .................. 310/89; 310/40 MM; 310/43; 310/71; 310/154; 310/239
[58] Field of Search ............ 310/40 MM, 90, 89, 154, 310/268, 239, 242, 245, 247, 248, 43, 45, 91, 71, 49, 162, 163

[56] References Cited

U.S. PATENT DOCUMENTS

| | | | |
|---|---|---|---|
| 3,308,319 | 3/1967 | Faulhaber | 310/154 |
| 3,527,969 | 9/1970 | Papst | 310/89 |
| 4,086,510 | 4/1978 | Watanabe | 310/40 MM |
| 4,093,882 | 6/1978 | Furuta | 310/154 |
| 4,119,875 | 10/1978 | Noguchi | 310/242 |
| 4,127,785 | 11/1978 | Noguchi | 310/40 MM |
| 4,303,844 | 1/1981 | Suzuki | 310/154 |
| 4,327,304 | 4/1982 | Aoki | 310/40 MM |
| 4,349,761 | 9/1982 | Aoki | 310/154 |

Primary Examiner—R. Skudy
Attorney, Agent, or Firm—Guy W. Shoup; Gerard F. Dunne

[57] ABSTRACT

A brush mounting structure of a miniature motor wherein brushes of the motor are fastened to bent end pieces of terminal plates, the terminal plates are fixed to a metallic bracket through a plastic film by means of insulating rivets, and the bracket is attached to an open surface of a case of the motor, whereby a soldering operation can be dispensed with.

3 Claims, 4 Drawing Figures

BRUSH-MOUNTING STRUCTURE OF MINIATURE MOTOR

BACKGROUND OF THE INVENTION

The present invention relates to a structure for mounting terminal plates each having a brush fastened thereto onto a bracket of a miniature motor. More particularly, it relates to a brush-mounting structure of the specified type which enhances the assembling job efficiency and prevents deterioration of brushes.

For the comparison with the present invention, a conventional miniature motor will be first explained with reference to FIGS. 1 and 2 which illustrate a cup-shaped metallic case 20 having the central portion of its top wall 21 projected outwardly and having a central hole 22 receiving a bearing 26. A recessed step 25 is formed at the inner peripheral edge of the open end of the case 20, except for portions accomodating the terminals of the motor. A rotor 27 has a plurality of coils 28, and a ring-shaped electrode plate 29 and a disk-shaped magnetic plate 30 are fixed to a rotary shaft 32 unitarily by the use of a synthetic resin portion 31. The rotor 27 is held on the rotary shaft 32 between the bearing 26, and a commutator 34 mounted so as to rotate unitarily with the rotary shaft 32. A permanent magnet 35 is fixed to a ring-shaped supporting member 36, and is disposed near the coils 28. The supporting member 36 has lugs 37 fitting in to the case 20.

A bracket 38 is attached to the open end of the case 20. An assembly on the bracket 38 will be described in detail with reference to a perspective view of FIG. 2. The bracket 38 is made of a substantially circular metal plate such as iron plate, and has a terminal portion 39 leading out from beneath the case 20. One surface of the metal plate 38 is wholly provided with an insulating film by coating, and a circuit portion 40 is formed on the insulating film. Terminal plates 42 made of a metal are soldered on the circuit portion 40, and their ends are formed into bent pieces 43, to which brushes 41 made of metal strips are fastened. The brushes 41 come into contact with the aforementioned commutator 34. On the circuit portion 40 of the bracket 38, a chip capacitor 49 for preventing electric noise, and the like are also soldered. Further, a member 48 for receiving the thrust load of the rotary shaft 32 is adhered onto the central part of the bracket 38.

As stated above, in the construction of this known miniature motor, the terminal plates 42 and other components are soldered in position. Soldering a member which includes a contact part often results in sulphurizing the contact due to the solder flux, a gas produced during the soldering operation, and the like, and waveform noise or the like may result. Moreover, the soldering operation forms an unstable factor as regards the job efficiency.

SUMMARY OF THE INVENTION

The present invention has been made in view of the disadvantages mentioned above, and has for its object to provide a bracket assembly for mounting a brush which can avoid sulphurization of contacts and which is excellent in the assembling job efficiency.

In a brush mounting structure of a miniature motor according to the present invention, brushes of the motor are fastened to bent end pieces of terminal plates, the terminal plates are fixed to a metallic bracket through a plastic film by means of insulating rivets, and the bracket is attached to an open surface of a case of the motor.

BRIEF DESCRIPTION OF THE DRAWINGS

FIGS. 1 and 2 concern a conventional miniature motor, in which FIG. 1 is a sectional view and FIG. 2 is an exploded perspective view of essential portions; and FIGS. 3 and 4 concern an embodiment of the present invention, in which FIG. 3 is a sectional view and FIG. 4 is a perspective view of essential portions.

PREFERRED EMBODIMENT OF THE INVENTION

Figure 1:
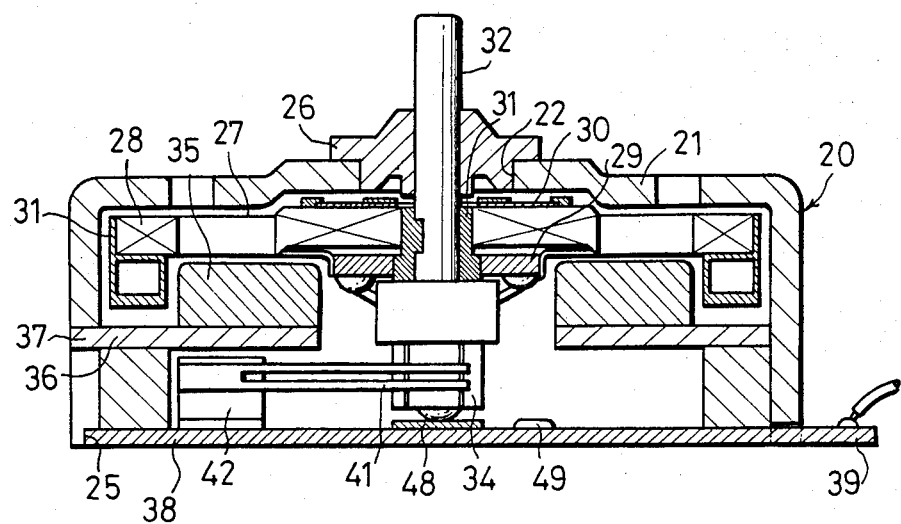
Figure 2:
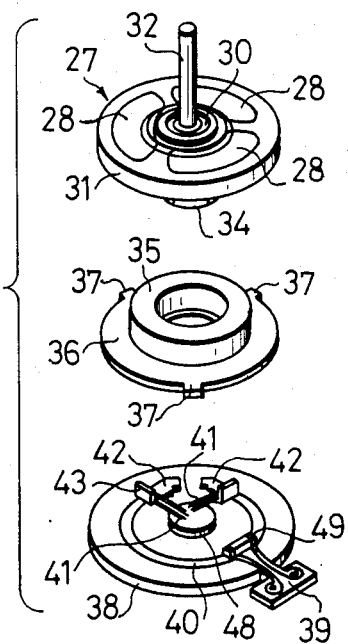

The present invention will now be described in conjunction with an embodiment illustrated in FIGS. 3 and 4. The same parts as in the prior art of FIGS. 1 and 2 are assigned the same numerals, and will not be repeatedly explained.

Figure 3:
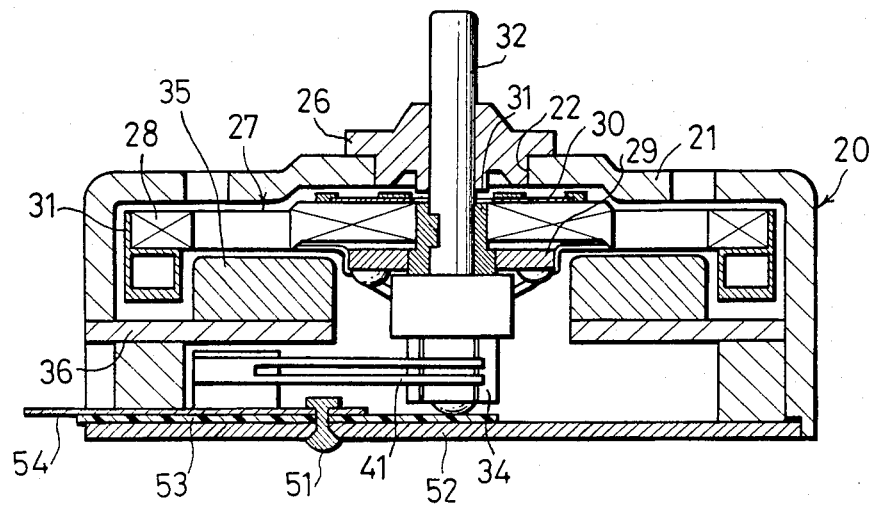
Figure 4:
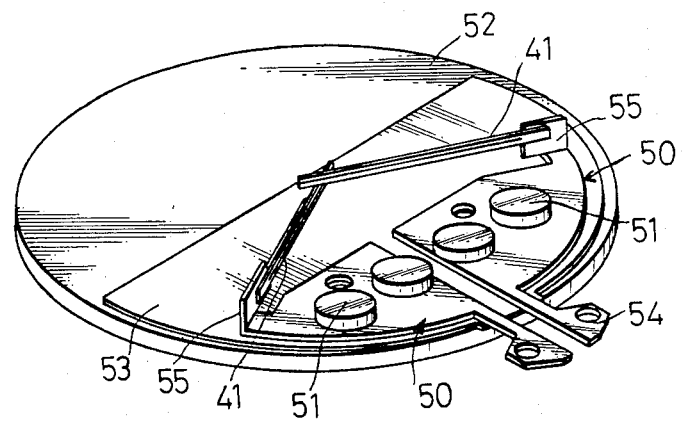

Referring to FIGS. 3 and 4, numeral 52 designates a bracket which is made of a metal plate such as iron plate in the form of a disc. The bracket 52 is provided at its outer periphery with a protuberance for positioning in the step of the case 20 for attachment thereto, though it is not shown. A substantially semicircular film 53 made of an insulating plastic material is adhered to one surface of the bracket 52, and serves as the insulator between terminal plates 50 and the bracket 52. Each of the terminal plates 50 includes an external input terminal portion 54, and a bent end piece 55 to which a brush 41 is fastened. Each terminal plate is fixed to the bracket 52 through the plastic film 53 by means of insulating rivets 51 made of a plastic material or the like. As shown in FIG. 3, in the assembled state in which the bracket 52 is attached to the open end of a case 20, the end of a rotary shaft 32 within the case abuts on the plastics film 53, and the brushes 41 lie in resilient contact with a commutator 34. Thus, when current is conducted through the terminal plates 50, a magnetic path is formed to rotate the rotor 27, and, accordingly, the rotary shaft 32.

As set forth above, the present invention consists in the structure wherein the terminal plates 50 with the brushes 41 fastened thereto are mounted on the bracket 52 through the plastic film 53 by the insulating rivets 51. Therefore, the sulphurization of contacts attributed to soldering as in the prior art can be prevented, and the job efficiency is excellent. In addition, since the bracket formed with the comparatively expensive insulating coating as in the prior art need not be used, an inexpensive brush mounting structure can be provided, which has a high practical value. Besides, the plastic film can also serve also as a bearing, which is convenient.

What is claimed is:

1. In a motor having a case carrying a bearing in an upper wall portion and having an open bottom, a rotary shaft rotatably held by said bearing and carrying a rotor, a permanent magnet fixed within said case so as to oppose said rotor in proximity thereto, and brushes lying in contact with a commutator mounted on said rotor shaft; means for mounting said brushes within said motor, said means including a bracket made of a metal plate and held across the open bottom of said case, said bracket having a plastic film lying thereover, and terminal plates each secured onto said plastic film and having upstanding bent portions holding said brushes, said terminal plates being secured by rivets formed of insulating material and extending through said plastic film and said bracket.

2. A brush mouting structure of a motor as defined in claim 1, wherein said plastic film is substantially semi-circular and is held to one surface of said bracket, and an end of said rotary shaft within said case abuts on said plastic film.

3. A brush mounting structure of a motor as defined in claim 1, including means formed by said plastic film for providing a bearing surface for an end portion of said rotary shaft.

* * * * *